United States Patent [19]
Busch, Jr.

[11] Patent Number: 5,558,775
[45] Date of Patent: Sep. 24, 1996

[54] PROCESS FOR THE TREATMENT OF HAZARDOUS WASTE WATER

[75] Inventor: Joseph B. Busch, Jr., Coral Springs, Fla.

[73] Assignees: Joseph Busch, Jr., Coral Springs, Fla.; Joseph Busch, Sr., Edison, N.J.

[21] Appl. No.: 332,660

[22] Filed: Nov. 1, 1994

[51] Int. Cl.⁶ ..................................................... C02F 1/44
[52] U.S. Cl. ..................... 210/638; 210/639; 210/641; 210/650; 210/651; 210/652; 210/663; 210/666; 210/694; 210/712; 210/721; 210/725; 210/727; 210/748; 210/758; 210/787; 210/806; 210/900; 210/909; 210/912
[58] Field of Search .................................... 210/638, 639, 210/641, 650, 651, 652, 663, 666, 694, 712, 721, 722, 724, 725, 727, 748, 758, 759, 787, 806, 900, 909, 912

[56] References Cited

U.S. PATENT DOCUMENTS

| | | | |
|---|---|---|---|
| 5,039,416 | 8/1991 | Loew et al. | 210/631 |
| 5,059,317 | 10/1991 | Marius et al. | 210/202 |
| 5,174,901 | 12/1992 | Smith | 210/806 |
| 5,227,071 | 7/1993 | Torline et al. | 210/806 |
| 5,259,972 | 11/1993 | Miyamaru et al. | 210/900 |
| 5,368,726 | 11/1994 | Masoomian | 210/202 |
| 5,374,356 | 12/1994 | Miller et al. | 210/641 |

*Primary Examiner*—Peter A. Hruskoci
*Attorney, Agent, or Firm*—Louis E. Marn

[57] ABSTRACT

There is disclosed a portable assembly for treating hazardous waste water having a plurality of paired filter units having filter mediums and operated at high filter rates to minimize solids build up wherein solids are caused to be smashed and broken by shear forces and wherein chemicals are sequentially added to facilitate solids reduction, to oxidize organic compounds and to precipitate dissolved solids and wherein the process stream is subjected to ultraviolet light to reduce organic loading and downstream ultra filtration units to further reduce solids followed by reverse osmosis and/or ionization treatment.

8 Claims, 1 Drawing Sheet

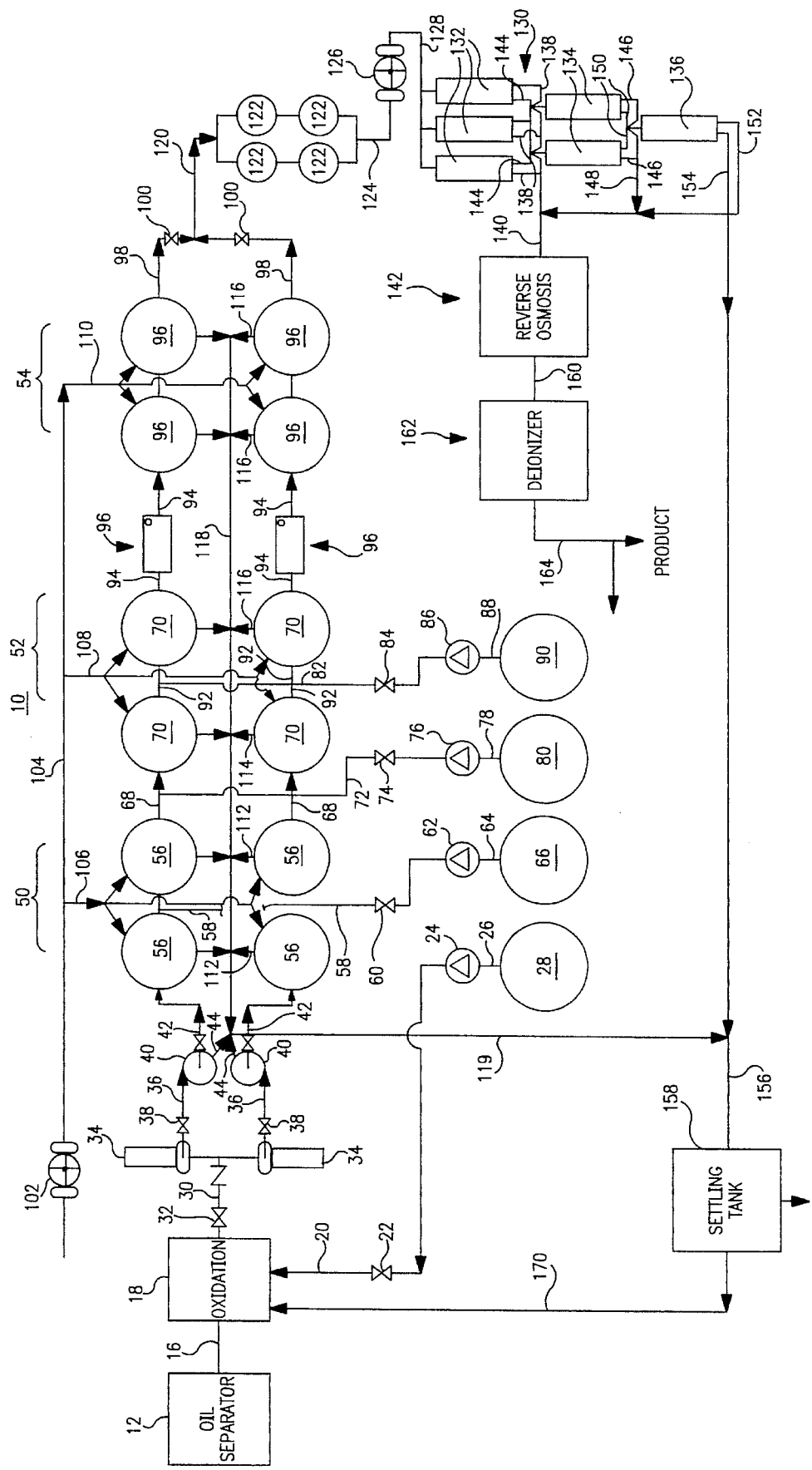

PROCESS FOR THE TREATMENT OF HAZARDOUS WASTE WATER

BACKGROUND OF THE INVENTION

1. Field of the Invention

This invention relates to a process and apparatus for treating hazardous waste water, and more particularly to a mobile apparatus for the treatment of hazardous waste waters as required by the EPA Toxicity Characteristic Teaching Procedures Rules D004–D043 (Sep. 1, 1990) and F001 to F005 to form a treated or product water which is non-toxic and reusable or recyclable (zero discharge of waste water).

2. Background of the Invention

With increasing pressure of pollution control laws, diminishing potable drinking water resources, and in escalating water and sewer cost, U.S. and overseas industries are considering the alternative of industrial process waste water reclamation and reuse as a viable solution to such problems. On-site commercial and industrial waste water reclamation and reuse is becoming a basic cost of manufacturing and a means to reduce water, sewer, chemicals and energy costs for process, cooling, washing, rinsing and cleaning water uses.

Hazardous and solid waste regulations have greatly reduced the amount of waste a manufacturing business can generate. Federal regulatory bodies governing the management of hazardous waste define hazardous waste as any solid waste which has the potential to harm human life or the environment. Under the passage of the Resource Conservation and Recovery Act of 1976, large quantity generators are defined as those generating less than 1000 kg per month of hazardous waste.

The Hazardous and Solid Waste Amendment of 1984 has significantly changed such systems by defining the LQG as one generating 1000 kg (approximately 2200 lbs. or 270.5 gallons) per month of such waste. These changes have resulted in greatly increasing the number of regulated generators and the number of regulated waste as well as increasing the pressure on local bodies to ensure that hazardous waste is not being introduced into the municipal water stream.

Among the many large quantity generators affected by such regulations are oil companies, such as refiners and distribution terminals, electronic manufacturing companies, chemical companies, industrial dry cleaning and laundry establishments, etc. Numerous contaminants are generated by the automobile service center in everyday operation, such as in the cleaning and repairing of engine parts. Included among these contaminants are solvents, sediment, used oil, organic compositions, such as antifreeze and a wide variety of heavy metals including significant quantities of copper, zinc, mercury, chromium and lead. In the past, such wastes have been disposed in municipal sewerage systems, septic tanks and underground storage tanks. Today's methods are very costly in that special disposal is necessary and that such municipal systems have high pretreatment requirements prior to disposal as a commercial/industrial user.

The EPA Toxicity Characteristic Teaching Procedures Rules D004–D043 (Sep. 1, 1990) set forth the list of toxic wastes and F wastes that are treatable to produce a treated or product water essentially non-toxic and reusable or recyclable (0 discharge of waste water).

Generally, plants are being built with consideration for dedicated on-site facilities for treating such waste waters; however, there is a need for a portable assembly for treating any and all such waste waters which may be facilely moved from site to site to effectively treat any and all such process waste waters thereby obviating dedicated on-site facilities thereby substantially reducing capital investments while accomplishing the desired requirements of treating toxic waste to render the resulting product water recyclable or reusable.

OBJECTS OF THE INVENTION

An object of the present invention is to provide an improved portable assembly for treating hazardous waste waters.

Another object of the present invention is to provide an portable process which may be readily moved from site to site and facilely connected to storage tanks for the treatment of hazardous waste waters.

Still another object of the present invention is to provide an improved portable assembly of a capacity to treat a hazardous waste water stream having D004–D043 and F waste to form recycled water.

Yet another object is to provide an assembly for treating hazardous waste water with minimal unit processes and operations.

SUMMARY OF THE INVENTION

These and other objects of the present invention are achieved by a portable assembly for treating hazardous waste water having a plurality of paired filter units having filter mediums and operated at high filter rates to minimize solids build up wherein solids are caused to be smashed and broken by shear forces and wherein chemicals are sequentially added to facilitate solids reduction, to oxidize organic compounds and to precipitate dissolved solids and wherein the process stream is subjected to ultraviolet light to reduce organic loading and downstream ultra filtration units to further reduce solids followed by reverse osmosis and/or ionization treatment.

BRIEF DESCRIPTION OF THE DRAWINGS

These and other objects of the present invention will become apparent upon consideration of the detailed disclosures especially when taken with the accompanying drawing which is a schematic flow diagram of the apparatus and process of the present invention.

BRIEF DESCRIPTION OF THE INVENTION

Referring now to the drawing, there is illustrated a combined chemical and physical assembly for treating commercial and/or industrial hazardous waste, generally indicated as 10. It is to be understood that equipment, such as certain conduits, valves, indicators and the like have been omitted from the drawing to facilitate the description hereof and placing of such equipment at appropriate places is deemed to be within the scope of those skilled in the art, as is the operation of filters. The process and apparatus of the present invention treats 100 gallons per minute of hazardous waste water and is provided, in part, with parallel trains having a capacity of 50 gallons per minute, as more fully hereinafter described.

The apparatus and process of the present invention includes a plurality of unit processes and unit operations for treating hazardous waste water mounted on a portable unitary structure for site to site relocation. The apparatus 10 includes an oil/water separator 12 having an inlet conduit 14 for the hazardous waste water to be treated and an exit conduit 16 in fluid communication with an oxidation tank 18. The oil/water separator 12 is provided with three coalescing stages.

The oxidation tank 18 is in fluid communication by conduit 20 under the control of valve 22 with the discharge side of a pump 24 with the suction side thereof in fluid communication by line 26 with a storage tank 28 as more clearly hereinafter described. The oxidation tank 18 is provided with an outlet conduit 30 under the control of valve 32 with the suction side of pumps 34. The discharge side of the pumps 34 is in fluid communication by conduit 36 under the control of valves 38 with cyclone separators 40. The cyclone separators 40 are provided with overflow product outlet conduits 42 and bottom outlet conduits 44.

The product outlet conduit 42 of a cyclone separator 40 is in fluid communication with a plurality of paired filter units including primary multi-media filter assembly, generally indicated as 50, secondary or polishing multi-media filter assembly, generally indicated as 52 and organic reduction filter assembly, generally indicated as 54. It will be understood by one skilled in the art that when one of the paired filter units is on stream the other is being regenerated or is in standby readiness. The schematic flow diagram being simplified in the interest of clarity.

The primary multi-media assembly 50 is comprised of a paired filter units 56 layered with anthracite, sand, garnet and gravel (under drain). A conduit 58 under the control of valve 60 is connected to conduit 42 and is in fluid flow communication with the discharge side of a pump 62 with its suction side in fluid communication by conduit 64 with a storage tank 66 of a cationic organic polymer, as more fully hereinafter described.

The filter units 56 are provided with a product outlet conduit 68 in fluid flow communication with paired filter units 70 of the secondary or polishing multi-media assembly 52. A conduit 72 under the control of a valve 74 is connected to conduit 68 and is in fluid communication with the discharge side of a pump 76 with its suction side in fluid communication by line 78 with a storage tank 80 containing an oxidizer solution, as more fully hereinafter described. The filter units 70 are sequentially layered with a filter media comprised of anthracite, sand, garnet, garnet and gravel (under drain). A conduit 82 under the control of valve 84 is in fluid flow of the discharge side of a pump 86 with its suction side in fluid communication by conduit 88 with a storage tank 90 of a material for precipitating metals, as more fully hereinafter described. The conduit 82 is connected to a conduit 92 positioned between paired filter units 70.

The downstream filter units 70 of the filter assembly 52 are in fluid flow communication by conduit 94 with the organic reduction filter assembly 54 via an ultraviolet sterilization assembly, generally indicated as 96, as more fully hereinafter described. The organic reduction filter assembly 54 is comprised of paired filter units 96 layered with a carbon and gravel media. An outlet conduit 98 under control valve 100 is connected to filter units 96 of the organic reduction filter assembly 54.

A filter regeneration pump 102 is provided, connected by a main conduit 104 via conduits 106, 108, 110 to filter units 56, 70 and 96 of the filter assemblies 50, 52 and 54, respectively. The filter units 56 70 and 96 are provided with waste outlet conduits 112, 114 and 116, respectively, connected to a main outlet conduit 118 connected to bottoms outlet conduits 44 from the cyclone separators 40 and combined in line 119, as more fully hereinafter described. micron cartridge conduits 98 are connected via conduit 120 to a plurality of paired in line micron cartridge filters 122. An outlet conduit 124 from the filters 122 is in fluid communication with the suction side of a high pressure pump 126. The discharge side of the high pressure pump 126 is in fluid flow communication by conduit 128 with an ultra filtration system, generally indicated as 130.

The ultra stage filtration system 130 is comprised of a first stage including three modules 132, a second stage comprised of two modules 134 and a third stage comprised of one module 136. A product outlet conduit 138 is connected to the discharge side of the first stage modules in fluid flow communication with a conduit 140 with a reverse osmosis assembly, generally indicated as 142. Modules 132 of the first stage ultra stage filtration system are provided with bottoms outlet conduits 144 for passing rejected waste to the second stage modules 134. A product outlet conduit 146 is connected to the second stage modules 134 of the ultra stage filtration system 130 in fluid flow communication by a conduit 148 to the reverse osmosis assembly 142. Bottoms outlet conduits 150 are provided to the second stage modules 134 of the ultra stage filtration system 130 for passage of rejected waste to the last stage module 136 of the ultra filtration assembly system 130. The third stage module 130 is provided with a product outlet conduit 152 in fluid flow communication with the conduit 140 to the reverse osmosis assembly 142 and with a bottom outlet conduit 154 for passage of rejected waste by conduit 156 to a settling tank 158.

The product water streams in the conduits from each stage of the ultra stage filtration systems 130 are introduced into the reverse osmosis assembly 142. An outlet conduit 160 is connected to the reverse osmosis assembly 142 in fluid flow communication with deionizer assembly 162. A product outlet conduit 164 is connected to the deionizer assembly 162 for the recyclable water.

A conduit 170 is in fluid flow communication from the settling tank 150 for recycling waste water to the oxidation tank 18 as more fully hereinafter described.

Waste water to be treated is initially analyzed qualitatively and quantitatively to establish operating parameters for all unit operations as well as unit processes requiring predetermined qualitative additions of processing chemicals, such as the oxidizers, polymers, etc. It will be understood by one skilled in the art that some chemicals need not be added or that all components of the assembly 10 may not be required in the treatment of a hazardous waste water stream. Also, in the interest of understanding and simplicity, the following describes a single train of the assembly.

Hazardous waste water, for example, including all potential toxic waste, oil and the like, as hereinbefore described, in conduit 14 is introduced into the oil/water separator 12 wherein oil droplets are merged into larger ones which rise to the surface permitting the removal of processed waste water having oil particles of less than about 1 micron. The oil/water separator 12 operates at a slight vacuum to avoid emulsification of oil in downstream units and reduces the free oil content to the order of less than about 10 ppm.

Processed waste water withdrawn from the oil/water separator 12 in conduit 16 is introduced into the oxidation tank 18 together with an oxidizing chemical, such as hydrogen peroxide or the like, introduced by conduit 20 from the storage tank 28 in an amount sufficient to oxidize organic compounds in the waste water being processed. The strength of the oxidizing chemical is a function of the C.O.D. and T.O.C. loading up to about 2,000 ppm or 0.2% by weight. Thus, in the oxidation tank 18, hydrocarbons present in the stream being treated are converted to carbon dioxide and water providing rapid destruction of chlorinated and non-chlorinated hydrocarbons and humic acid. Carbon dioxide acts as a strong organic solvent. Many organic chemicals are soluble in carbonic acid, but are of limited solubility in water.

Processed water stream is withdrawn in line 30 from oxidation tank 18 and passed by pump 34 to the cyclone separator 40 wherein heavy particles of a specific gravity greater than 1.0 are separated from the process stream being treated. Centrifugal separator 40 is operated at a high rate turbidity reduction at low pressure losses of from about 4.0 to 8.0 psi wherein about 98% of the suspended particles of greater than about 75 microns (0.003 inches) are removed as a bottom stream. The bottom stream of suspended particles from the cyclone separator 40 is passed by conduit 44 via conduit 119 to the settling tank 158.

The thus overflow processed stream from the cyclone separator 40 is passed by conduit 42 to the multimedia filter assembly 50. As hereinabove discussed, the fluid to be processed is alternately passed through one of the filter units 56. The filter units 56 are operated at a flow rate of from 70 to 105 gallons per minute, preferably 7 gallons per minute per ft.$^2$ (as compared to conventional or dual media filters) wherein particulate material of greater than about 10 microns are removed during passage through the filter media in the filter units 56. To facilitate suspended solids reduction, a polymer is introduced by conduit 58 from tank 66 into the fluid being processed in conduit 42 prior to introduction between the filter units 56 of the primary filter assembly 50.

From the primary filter assembly 50, the thus processed stream is passed by conduit 68 to the secondary or polishing multimedia filter assembly 52. A caustic solution in conduit 72 from tank 80 is introduced into the processed stream in conduit 68 to inter alia, dissolve carbon dioxide helping to reduce organic loading by extraction at pH above about 8.5 and to precipitate hydroxides of heavy metals which are generally insoluble. Generally of from 50 to 140 ppm of caustic is added as a function of carbon dioxide loading. Here again, the filter units 70 are operated at a flow rate of from 70 to 105 gallons per minute, preferably 7.0 gallons per minute per ft.$^2$ thereby to remove particulate material down to about 10 microns.

The thus processed stream in conduit 94 is passed through ultraviolet sterilization unit 96 prior to introduction into the organic reduction filter assembly 54. In the ultraviolet sterilization unit 96, the liquid being processed is subjected to ultraviolet light to further reduce organic loading. An alkali metal precipitant in the conduit 82 from tank 90 is introduced into the liquid stream being processed in conduit 92 prior to introduction into the second filter unit 70 of the filter assembly 52. Of from about 2 to 15 ppm of the alkali metal precipitant is added per 1 ppm of heavy metal ions. In the filter unit 70 of the polishing filter assembly 52, particles are also removed down to 10 ppm. In the filter units 70 of the assembly 52, colloidal matter for high clarity filtration is removed of up to about 90% of suspended solids in the liquid being processed. By effecting rapid coagulation, flocculation and sedimentation, no sludge is produced as a by product for disposal.

The thus treated stream withdrawn from the ultraviolet sterilization unit following passage through polishing filter assembly 52 in conduit 98 is sequentially passed through the paired in-line carbon filter units 96 of the organic reduction filter assembly 54 whereby organic (chlorine), detergent, color, P.C.B.'s and trace oil are removed.

A thus treated processed stream in conduit 120 containing trace amounts of organics is withdrawn from the filter units 96 of the organic reduction assembly 54 and passed to micron cartridge filters 122 and thence through conduit 124 to the stages of the ultra filtration assembly 130 wherein product overflow water streams containing inorganics and total dissolved solids are passed by conduits 138, 148 and 152 to the reverse osmosis unit 142 via conduit 140. The stages of the ultra filtration system are based on membrane technology. In the ultra filtration assembly 130, emulsified oil and suspended solids are concentrated and separated from a processed liquid stream with filtration media being replaced from time-to-time as required.

In the reverse osmosis system 142, the liquid stream in conduit 140 is treated to remove total dissolved solids and inorganics (metals).

Deionizer unit 162 is in fluid communication by conduit 160 with the reverse osmosis system 142. The deionizer unit operates to remove, if necessary, dissolved solids (especially heavy metals) for final polishing.

The filter units of the various filtration assemblies are regenerated in a manner known to one skilled in the art, generally when the pressure differential between the inlet/outlet reaches about 10 psig. Regeneration is effected in a period of about 20 minutes at a back flow rate of about 90 gallons per minute.

While the present invention has been described with reference to a preferred embodiment, it will be understood by one skilled in the art that the present invention is applicable to a dedicated site having predetermined and defined hazardous waste water effluents whereby units of the preferred embodiment may be selectively combined (without certain outer units to treat such hazardous waste water. For example, if the hazardous waste water includes only hydrocarbons, those unit processes and operations required for the removal of heavy metals obviously are not required for a dedicated site and vice-versa.

While the invention herein has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. A process for treating hazardous waste water containing organic components, suspended solids, and colloidal matter to produce recyclable water, which comprises the steps of:

a) introducing said hazardous waste water stream;

b) contacting said stream with an oxidizing agent to oxidize said organic components in said said stream;

c) passing a stream resulting from step b) through a separation zone to remove solids having a specific gravity greater than 1.0 to form a liquid stream;

d) contacting said liquid stream of step c) with a polymer to facilitate suspended solids reduction and introducing same into a separation zone to remove suspended solids;

e) contacting a liquid stream from step d) with a caustic solution and introducing same into a separation zone to remove particulates of less than about 10 microns.

f) contacting a liquid stream from step e) with an alkali-metal precipitant if said hazardous waste water being treated contains a heavy metal compound and introducing same into a separation zone to remove solids of a particle size down to about 10 microns;

g) passing a liquid stream from step f) through an ultraviolet zone to reduce organic loading;

h) passing a liquid stream from step g) through a separation zone to reduce colloidal matter to less than about 10%;

i) passing a liquid stream from step h) through a carbon filter zone to further reduce organic components; and j) passing a liquid stream from step i) through a micron filter zone to produce recyclable water.

2. The process for treating hazardous waste water as defined in claim 1 and further including the step of passing said recyclable water of step j) through a reverse osmosis zone to further remove dissolved solids and inorganics, when said hazardous waste water contains heavy metal ions.

3. The process for treating hazardous waste water as defined in claim 1 wherein step c) is effected in a cyclone separator at pressure losses of from about 4.0 to 8.0 psig whereby about 98% of suspended solids greater than about 75 microns are removed from said stream.

4. The process for treating hazardous waste water as defined in claim 1 wherein said separation zone of step d) is performed at a flow rate of from 70 to 105 gallons per minute at a filter rate of about 7.0 gallons per minute per ft.$^2$ to remove solids of a particle size greater than 10 microns.

5. The process for treating hazardous waste water as defined in claim 1 wherein said caustic solution of step e) is introduced in an amount to raise pH above about 8.5.

6. The process for treating hazardous waste water as defined in claim 5 wherein caustic solution is added at a rate of from 50 to 140 ppm as a function of carbon dioxide loading.

7. The process for treating hazardous waste water as defined in claim 5 wherein said separation zone of step d) is performed at a flow rate of from 70 to 105 gallons per minute at a filter rate of about 7.0 gallons per minute per ft.$^2$ to remove solids of a particle size greater than 10 microns.

8. The process for treating hazardous waste water as defined in claim 1 wherein said alkali-metal precipitant of step f) is added at a rate of from 2 to 15 ppm per ppm of ions of said heavy metal compound.

\* \* \* \* \*